(12) United States Patent
Gong et al.

(10) Patent No.: US 9,997,161 B2
(45) Date of Patent: Jun. 12, 2018

(54) AUTOMATIC SPEECH RECOGNITION CONFIDENCE CLASSIFIER

(71) Applicant: MICROSOFT TECHNOLOGY LICENSING, LLC, Redmond, WA (US)

(72) Inventors: Yifan Gong, Sammamish, WA (US); Chaojun Liu, Kirkland, WA (US); Kshitiz Kumar, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 245 days.

(21) Appl. No.: 14/852,083

(22) Filed: Sep. 11, 2015

(65) Prior Publication Data

US 2017/0076725 A1 Mar. 16, 2017

(51) Int. Cl.
| | | |
|---|---|---|
| *G10L 15/16* | (2006.01) | |
| *G10L 15/32* | (2013.01) | |
| *G10L 15/26* | (2006.01) | |
| *G10L 15/10* | (2006.01) | |
| *G10L 17/06* | (2013.01) | |
| *G10L 15/18* | (2013.01) | |
| *G06F 15/18* | (2006.01) | |
| *G06F 3/16* | (2006.01) | |

(52) U.S. Cl.
CPC ............. *G10L 15/32* (2013.01); *G10L 15/10* (2013.01); *G10L 15/26* (2013.01)

(58) Field of Classification Search
USPC .................................. 704/231–249; 715/728
See application file for complete search history.

(56) References Cited

U.S. PATENT DOCUMENTS

| | | | |
|---|---|---|---|
| 5,677,991 A | | 10/1997 | Hsu et al. |
| 5,790,754 A | * | 8/1998 | Mozer ..................... G10L 15/16 704/232 |

(Continued)

OTHER PUBLICATIONS

Kumar, et al., "Confidence Features for Automated Speech Recognition Arbitration", U.S. Appl. No. 14/941,058, filed Nov. 13, 2015, 24 pages.

(Continued)

*Primary Examiner* — Neeraj Sharma
(74) *Attorney, Agent, or Firm* — Holzer Patel Drennan

(57) ABSTRACT

The described technology provides normalization of speech recognition confidence classifier (CC) scores that maintains the accuracy of acceptance metrics. A speech recognition CC scores quantitatively represents the correctness of decoded utterances in a defined range (e.g., [0,1]). An operating threshold is associated with a confidence classifier, such that utterance recognitions having scores exceeding the operating threshold are deemed acceptable. However, when a speech recognition engine, an acoustic model, and/or other parameters are updated by the platform, the correct-accept (CA) versus false-accept (FA) profile can change such that the application software's operating threshold is no longer valid or as accurate. Normalizing of speech recognition CC scores to map to the same or better CA and/or FA profiles at the previously-set operating thresholds allows preset operating thresholds to remain valid and accurate, even after a speech recognition engine, acoustic model, and/or other parameters are changed.

20 Claims, 5 Drawing Sheets

(56) References Cited

U.S. PATENT DOCUMENTS

| | | | |
|---|---|---|---|
| 5,794,196 | A | 8/1998 | Yegnanarayanan et al. |
| 5,822,729 | A | 10/1998 | Glass |
| 6,021,387 | A | 2/2000 | Mozer et al. |
| RE38,101 | E | 4/2003 | Vysotsky et al. |
| 6,542,866 | B1 | 4/2003 | Jiang et al. |
| 6,735,562 | B1 | 5/2004 | Zhang et al. |
| 7,062,440 | B2 | 6/2006 | Brittan et al. |
| 7,177,808 | B2 * | 2/2007 | Yantorno ............... G10L 17/02 704/233 |
| 7,228,275 | B1 | 6/2007 | Endo et al. |
| 7,664,642 | B2 | 2/2010 | Espy-Wilson et al. |
| 7,756,700 | B2 | 7/2010 | Rose et al. |
| 7,822,603 | B1 | 10/2010 | Parthasarathy et al. |
| 7,933,777 | B2 | 4/2011 | Koll |
| 8,005,668 | B2 | 8/2011 | Arun |
| 8,239,203 | B2 | 8/2012 | Stubley et al. |
| 8,401,851 | B2 | 3/2013 | Bushey et al. |
| 8,639,508 | B2 | 1/2014 | Zhao et al. |
| 8,793,130 | B2 | 7/2014 | Wang et al. |
| 2002/0184030 | A1 | 12/2002 | Brittan et al. |
| 2004/0204930 | A1 * | 10/2004 | Chang .................. G10L 15/08 704/202 |
| 2005/0015251 | A1 * | 1/2005 | Pi ......................... G10L 15/16 704/232 |
| 2005/0055209 | A1 | 3/2005 | Epstein et al. |
| 2006/0200347 | A1 * | 9/2006 | Kim ..................... G10L 15/22 704/236 |
| 2006/0293886 | A1 * | 12/2006 | Odell .................... G10L 15/08 704/231 |
| 2007/0088552 | A1 | 4/2007 | Olsen |
| 2008/0195389 | A1 * | 8/2008 | Zhang .................. G10L 17/14 704/246 |
| 2008/0270135 | A1 * | 10/2008 | Goel ................. G10L 15/1822 704/257 |
| 2010/0198598 | A1 * | 8/2010 | Herbig ................. G10L 15/07 704/240 |
| 2010/0250250 | A1 | 9/2010 | Wiggs |
| 2011/0144986 | A1 | 6/2011 | Yu et al. |
| 2011/0144990 | A1 * | 6/2011 | Hoory .................. G10L 13/02 704/235 |
| 2011/0166855 | A1 * | 7/2011 | Vermeulen ............ G10L 15/32 704/231 |
| 2013/0041669 | A1 | 2/2013 | Ben-David et al. |
| 2013/0275135 | A1 | 10/2013 | Morales et al. |
| 2013/0289996 | A1 | 10/2013 | Fry |
| 2013/0325473 | A1 * | 12/2013 | Larcher ................ G10L 17/10 704/249 |
| 2014/0244257 | A1 * | 8/2014 | Colibro ................ G10L 17/04 704/246 |
| 2015/0019219 | A1 | 1/2015 | Tzirkel-Hancock et al. |
| 2015/0046163 | A1 | 2/2015 | Levit et al. |
| 2015/0301796 | A1 * | 10/2015 | Visser ................... G06F 3/167 715/728 |
| 2015/0364131 | A1 * | 12/2015 | Hakkani-Tur ...... G10L 15/065 704/235 |

OTHER PUBLICATIONS

Sankar, et al., "Automatic Confidence Score Mapping for Adapted Speech Recognition Systems", In Proceedings of IEEE International Conference on Acoustics, Speech, and Signal Processing, vol. 1, May 13, 2002, 4 Pages.

Torre, et al., "Histogram Equalization of the Speech Representation for Robust Speech Recognition", In Proceedings of IEEE Transactions on Speech and Audio Processing, Oct. 10, 2001, 19 Pages.

Lin, et al., "Cluster-based Polynomial-Fit Histogram Equalization (CPHEQ) for Robust Speech Recognition", In Proceedings of 8th Annual Conference of the International Speech Communication Association, Aug. 27, 2007, pp. 1054-1057.

Gollan, et al., "Confidence Scores for Acoustic Model Adaptation", In Proceeding of IEEE International Conference on Acoustics, Speech and Signal Processing, Mar. 31, 2008, pp. 4289-4292.

Ketabdar, H, et al, "Enhanced Phone Posteriors for Improving Speech Recognition Systems," published Aug. 16, 2010, In Proceeding of IEEE Transactions on Audio, Speech, and Language Processing, vol. 18, Issue 6, abstract only.

Fayolle, et al, "CRF-based Combination of Contextual Features to Improve a Posteriori Word-level Confidence Measures" published Sep. 26, 2010, In Proceeding of 11th International Conference on Speech Communication and Technologies, 4 pages.

Huang, et al, "Predicting Speech Recognition Confidence Using Deep Learning with Word Identity and Score Features," published May 26, 2013, In Proceeding of IEEE International Conference on Acoustics, Speech and Signal Processing, 5 pages.

Fu, et al, "Combination of Multiple Predictors to Improve Confidence Measure Bawed on Local Posterior Probabilities," published Mar. 18, 2005, In Proceeding of IEEE International Conference on Acoustics, Speech and Signal Processing, vol. 1, 4 pages.

Dahl, et al, "Context-Dependent Pre-Trained Deep Neural Networks for Large-Vocabulary Speech Recognition," published Jan. 2012, In Proceeding of IEEE Transactions on Audio, Speech, and Language Processing, vol. 20, Issue 1, 13 pages.

McDermott, et al, "Discriminative Training for Large-Vocabulary Speech Recognition Using Minimum Classification Error," published Jan. 2007, In Proceeding of IEEE Transactions on Audio, Speech, and Language Processing, vol. 15, Issue 1, 21 pages.

McCourt, et al, "Multi-Resolution CEPSTRAL Features for Phoneme Recognition Across Speech Sub-Bands," published May 12, 1998, In Proceedings on IEEE International Conference on Acoustics, Speech, and Signal Processing, vol. 1, 4 pages.

Hazen, et al, "A Comparison and Combination of Methods for OOV Word Detection and Word Confidence Scoring," published May 7, 2001, In Proceeding on IEEE International Conference on Acoustics, Speech, and Signal Processing, vol. 1, 4 pages.

Kirchhoff, "Integrating Articulatory Features into Acoustic Models for Speech Recognition," published May 2000, In Proceedings of the Workshop on Phonetics and Phonology in ASR, 14 pages.

Miyajima, et al, "A New Approach to Designing a Feature Extractor in Speaker Identification Based on Discriminative Feature Extraction," published Oct. 2001, In Proceedings of Speech Communication, vol. 35, No. 3-4, 16 pages.

Lee, et al, "Unsupervised Feature Learning for Audio Classification Using Convolutional Deep Belief Networks," published Dec. 7, 2009, In Proceedings of Advances in Neural Information Processing Systems, 9 pages.

* cited by examiner

AUTOMATIC SPEECH RECOGNITION CONFIDENCE CLASSIFIER

BACKGROUND

Automatic speech recognition (ASR) technology typically utilizes a corpus to translate speech data into text data. A corpus is a database of speech audio files and text transcriptions in a format that can be used to form acoustic models. A speech recognition engine may use one or more acoustic models to perform text transcriptions from speech data received from an audio source (e.g., a human speaker).

Determining whether the speech recognition engine has correctly decoded received speech (e.g., utterances) can be based on one or more acceptance metrics, which can be hard-coded into application software, such as a video game, dictation software, computerized personal assistant, etc. based on existing or anticipated speech recognition engines, acoustic models, and/or other parameters. In contrast, the speech recognition engines, acoustic models, and/or other parameters are often provided and updated in the computing platform on which the application software runs (e.g., the operating system of a computer, gaming system, vehicle communications system, or mobile device). Different speech recognition engines, acoustic models, and/or other parameters provided by the platform supplier can provide different confidence classifier scores, which may or may not align with the acceptance metrics provided by the application software suppliers. Accordingly, updates to speech recognition engines, acoustic models, and/or other parameters can make an application software's acceptance metrics obsolete or inaccurate.

SUMMARY

The described technology provides normalization of speech recognition confidence classifier (CC) scores that maintains the accuracy of acceptance metrics. A speech recognition CC scores quantitatively represents the correctness of decoded utterances in a defined range (e.g., [0,1]). An operating threshold is associated with a confidence classifier, such that utterance recognitions having scores exceeding the operating threshold are deemed acceptable. However, when a speech recognition engine, an acoustic model, and/or other parameters are updated by the platform, the correct-accept (CA) versus false-accept (FA) profile can change such that the application software's operating threshold is no longer valid or as accurate. Normalizing of speech recognition CC scores to map to the same or better CA and/or FA profiles at the previously-set operating thresholds allows preset operating thresholds to remain valid and accurate, even after a speech recognition engine, acoustic model, and/or other parameters are changed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

A speech recognition confidence classifier is generally trained to maximally discriminate between correct and false (or incorrect) recognitions. Confidence scores lie in a [0,1] range, with higher scores being attributed to correct recognitions and lower scores for (a) incorrect recognitions from in-grammar utterances and (b) any recognition from out-of-grammar utterances. The classifiers are trained from a specified set of acoustic models (AMs), grammar data, and speech data to establish a classifier profile in terms of correct-accept (CA) metrics and false-accept (FA) metrics at different thresholds. In one implementation, acceptance metrics are given as follows:

$$CA = \frac{\#All\_of\_Corrects\_Exceeding\_a\_Threshold}{\#All\_Corrects}; \text{ and}$$

$$FA = \frac{\#All\_of\_Incorrects\_Exceeding\_a\_Threshold}{\#All\_Incorrects}$$

where "#" indicates a count of correct or incorrect recognitions.

The issue of confidence normalization typically arises in the following situations, without limitation: (a) an operating threshold is hardcoded with a shipped software program (e.g., games, applications); (b) software program developers may not have expertise or data for operating threshold tuning; (c) it is preferable to decouple dependency of operating thresholds on acoustic models or confidence classifiers while allowing acoustic model updates without a need to update and operating threshold; (d) third-party speech applications may set their own operating thresholds, which may require updating in response to an acoustic model update, thereby potentially incurring a large downstream cost for the application developers; and/or (e) operating threshold tuning is not resource or cost effective yet may be required often for multiple speech application. Multiple implementations are described herein, including a histogram-based mapping, a polynomial-based mapping, and a tan h-based mapping. Other mappings may be employed.

Figure 1:
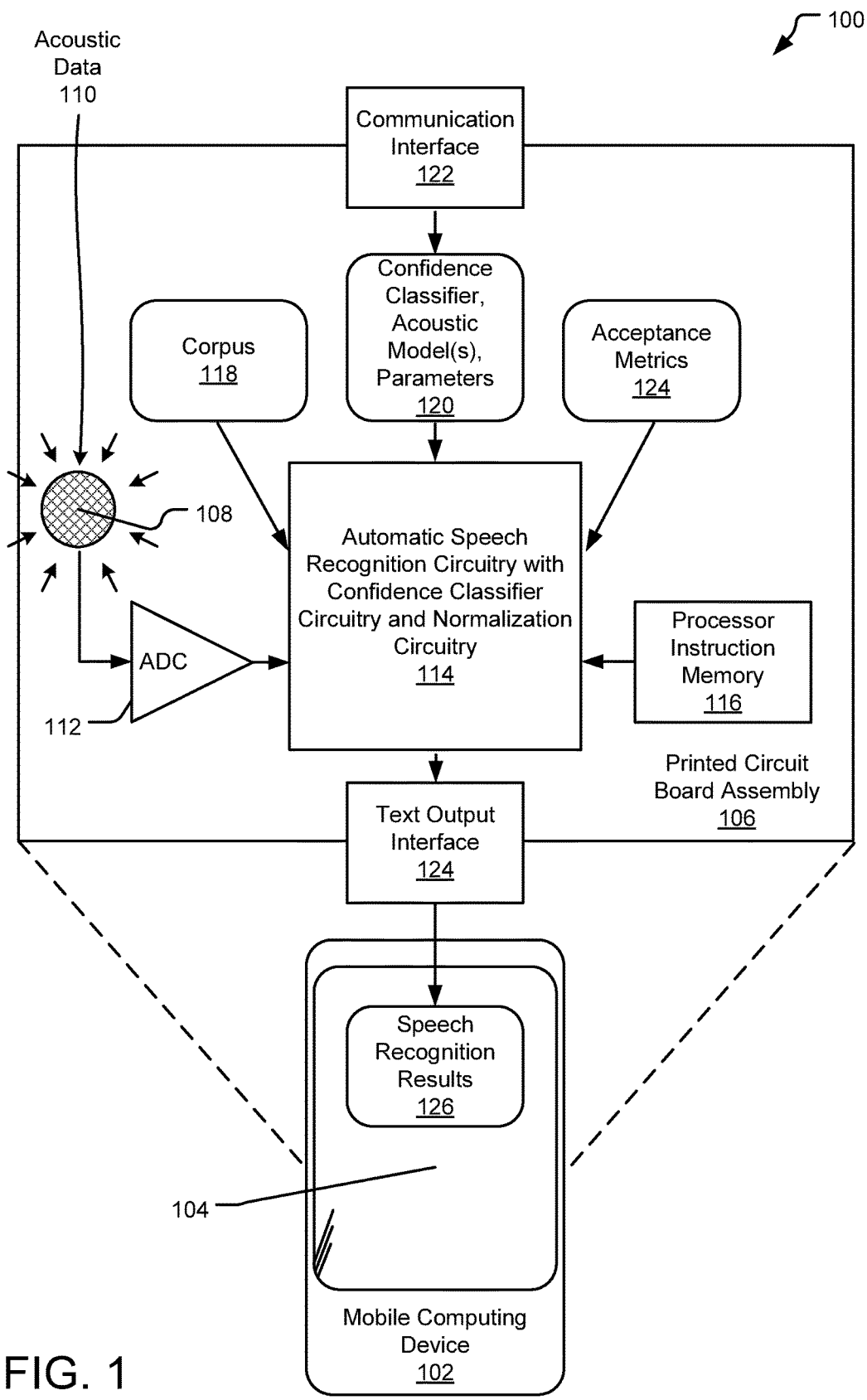
FIG. 1 illustrates an example speech recognition system for performing automatic speech recognition using normalization of confidence classifier scores.

FIG. 1 illustrates an example speech recognition system 100 for performing automatic speech recognition using normalization of confidence classifier scores. A mobile computing device 102 (an example speech recognition device) includes a display 104 and a printed circuit board assembly 106. The printed circuit board assembly 106 is connected to an audio input device (e.g., microphone 108), which receives acoustic data (e.g., acoustic utterances) and transfers the associated analog signals through an analog-to-digital converter (ADC) 112 to automatic speech recognition circuitry 114 mounted on the printed circuit board assembly 106. The automatic speech recognition circuitry 114 includes with confidence classifier circuitry and normalization circuitry under control of processor instructions stored in processor instruction memory 116. The automatic speech recognition circuitry 114 also accesses a corpus 118, a set 120 of confidence classifiers, acoustic models, and other parameters (stored in memory), which can be updated via a communications interface 122 (e.g., a network connection, a Universal Serial Bus (USB) port, etc.). Acceptance metrics, such as false-accepts (FAs), correct-accepts (CAs), and other thresholds and parameters are also stored in memory and can be used to define recognition acceptance conditions and mapping functionality.

A text output interface 124 receives accepted text recognized and transformed from the received utterances and outputs a signal representing the accepted text, such as speech recognition results 126 to the display 104.

Figure 2:
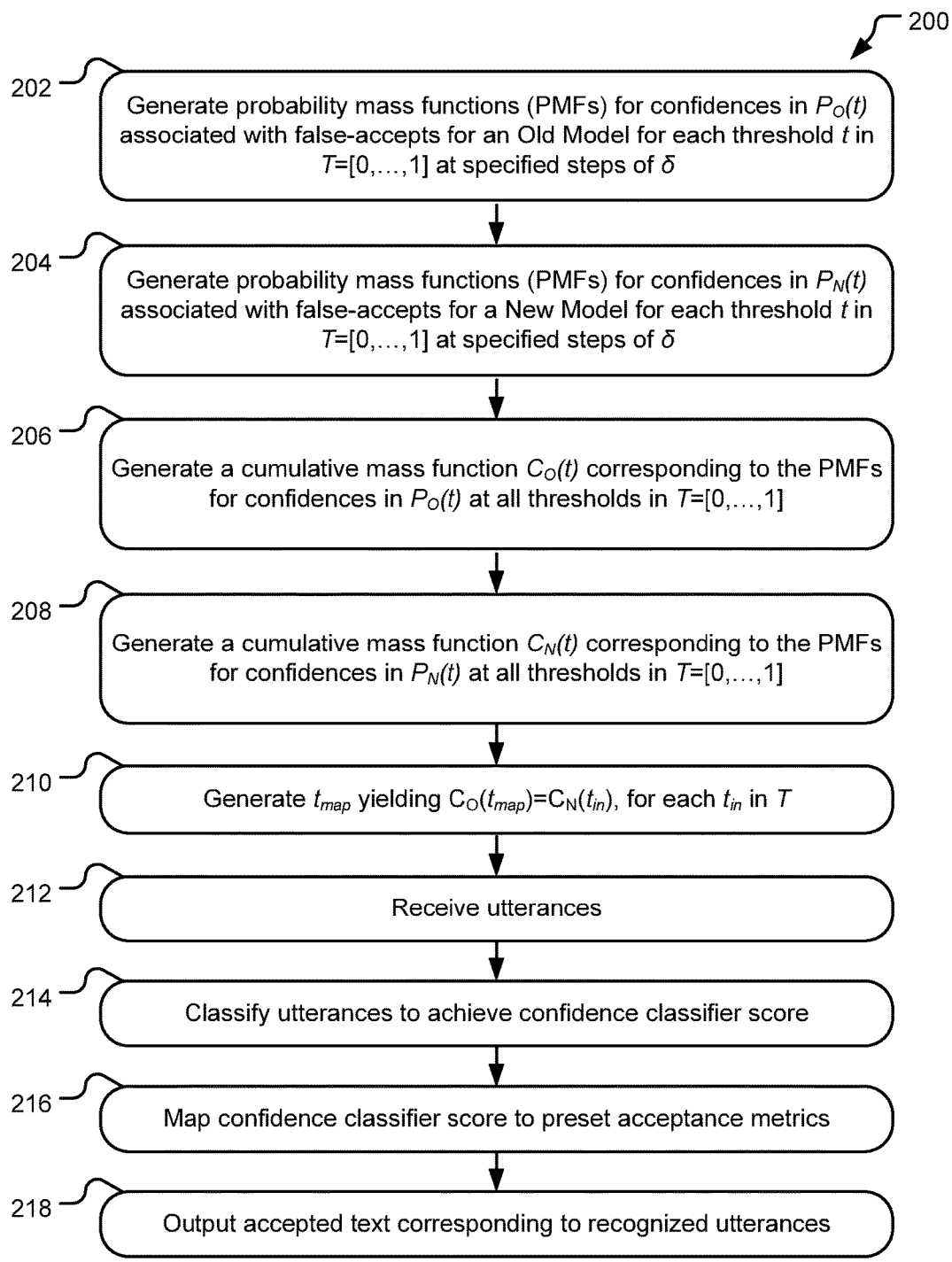
FIG. 2 illustrates example operations for normalizing confidence classifier scores using histogram-mapping.

FIG. 2 illustrates example operations 200 for normalizing confidence classifier scores using histogram-mapping. A PMF operation 202 generates probability mass functions (PMFs) for confidence scores in $P_O(t)$ associated with false-accepts from an "Old Model" (e.g., a first confidence classifier) for each threshold t in the set of thresholds T=[0, ..., 1] at specified intervals or steps $\delta$. A PMF operation 204 generates probability mass functions (PMFs) for confidence scores in $P_N(t)$ associated with false-accepts from a "New Model" (e.g., a second confidence classifier) for each threshold t in the set of thresholds T=[0, ..., 1] at specified intervals or steps $\delta$. A CMF operation 206 generates a cumulative mass function (CMF) for confidence scores in $C_O(t)$ associated with false-accepts from the Old Model for each threshold t in the set of thresholds T=[0, ..., 1] at specified intervals or steps $\delta$. A CMF operation 208 generates a cumulative mass function (CMF) for confidence scores in $C_N(t)$ associated with false-accepts from the New Model for each threshold t in the set of thresholds T=[0, ..., 1] at specified intervals or steps $\delta$.

A mapping operation 210 generates $t_{map}$ such that $C_O(t_{map})=C_N(t_{in})$, for each input threshold $t_{in}$ in T. Accordingly, a look-up table that maps a corresponding $t_{map}$ for every input $t_{in}$ in T=[0, ..., 1]. The interval $\delta$ limits the mapping resolution, and, generally, $t_{map}$ may be chosen such that $C_O(t_{map})$ is numerically closest to $C_N(t_{map})$. Based on the mapping operation 210, input confidence classifier scores can be distributed into bins corresponding to individual input thresholds ($t_{in}$) in T=[0, ..., 1] and normalized confidence scores can be selected from corresponding mapped thresholds ($t_{map}$) in T=[0, ..., 1].

Given the generated look-up table, a receiving operation 212 receives acoustic utterances. A classification operation 214 classifies the utterances to achieve a confidence classifier score under the New Model. A mapping operation 216 maps the confidence classifier score to a mapped confidence classifier score under the Old Model based on the look-up table and determines whether the mapped confidence classifier score satisfies the recognition acceptance condition (e.g., whether the score exceeds an acceptance threshold). If so, recognized text associated with the condition-satisfying confidence classifier score is output as accepted text corresponding to the recognized utterances in an operation 218.

It should be understood that the operations 200 could be modified to use correct-accepts instead of false-accepts. Alternatively, other acceptance metrics may potentially be used in operations 200 with a similar approach. In yet another alternative implementation, both false-accept mappings and correct-accept mappings are generated by individually learning the corresponding mappings for false-recognitions and correct-recognitions and then taking an appropriate weighted-average of the two mappings to yield a combined normalization mapping.

Figure 3:
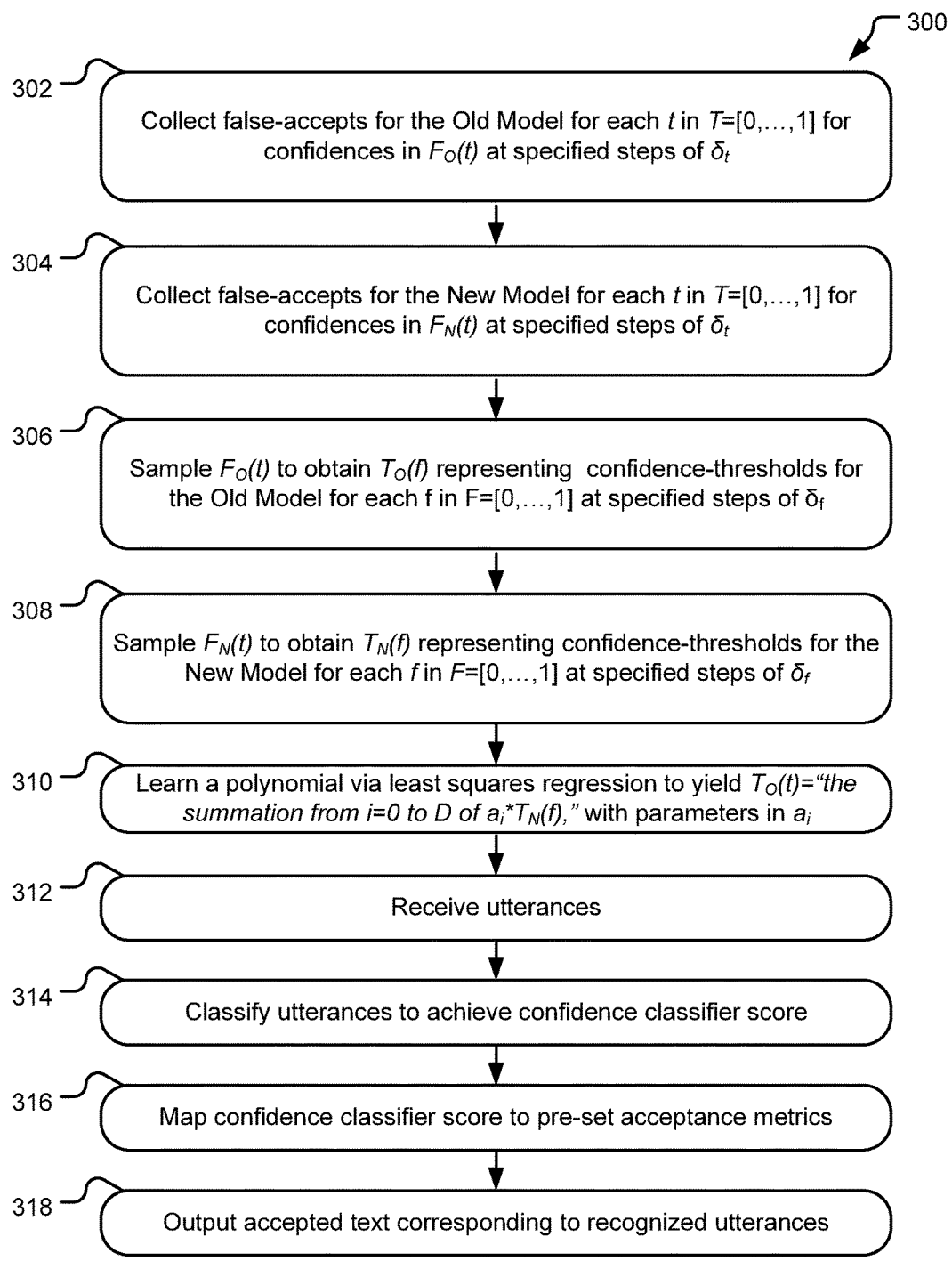
FIG. 3 illustrates example operations for normalizing confidence classifier scores using polynomial-mapping.

FIG. 3 illustrates example operations for 300 normalizing confidence classifier scores using polynomial-mapping. A collection operation 302 collects false-accepts for an Old Model (e.g., a first confidence classifier) for each threshold t in T=[0, ..., 1] for confidence scores in $F_O(t)$ at specified steps of $\delta_t$. A collection operation 304 collects false-accepts for a New Model (e.g., a second confidence classifier) for each threshold t in T=[0, ..., 1] for confidence scores in $F_N(t)$ at specified steps of $\delta_t$.

A sampling operation 306 samples $F_O(t)$ to obtain $T_O(f)$ representing confidence thresholds the Old Model (e.g., the first confidence classifier) for each false-accepts value f in F=[0, ..., 1] at specified steps of $\delta_f$. A collection operation 308 samples $F_N(t)$ to obtain $T_N(f)$ representing confidence thresholds for the New Model (e.g., the second confidence classifier) for each false-accepts value f in F=[0, ..., 1] at specified steps of $\delta_f$. In one implementation, $\delta_f = \delta_t = 0.1$, although other values and combinations may be employed.

A learning operation 310 learns a polynomial via least squares regression to yield $$T_O(t) = \sum_{i=0}^{D} a_i \cdot T_N(f)^i \forall f \text{ in } F,$$

with parameters in $a_i$.

Given the generated polynomial, a receiving operation 312 receives acoustic utterances. A classification operation 314 classifies the utterances to achieve a confidence classifier score under the New Model. A mapping operation 316 maps the confidence classifier score to a mapped confidence classifier score under the Old Model based on the mapping polynomial and determines whether the mapped confidence classifier score satisfies the recognition acceptance condition (e.g., whether the score exceeds an acceptance threshold). If so, recognized text associated with the condition-satisfying confidence classifier score is output as accepted text corresponding to the recognized utterances in an operation 318.

It should be understood that the operations 300 could be modified to use correct-accepts instead of false-accepts. Alternatively, other acceptance metrics may potentially be used in operations 300 with a similar approach. In yet another alternative implementation, both false-accept mappings and correct-accept mappings are generated by individually learning the corresponding mappings for false-recognitions and correct-recognitions and then taking an appropriate weighted-average of the two mappings to yield a combined normalization mapping.

Figure 4:
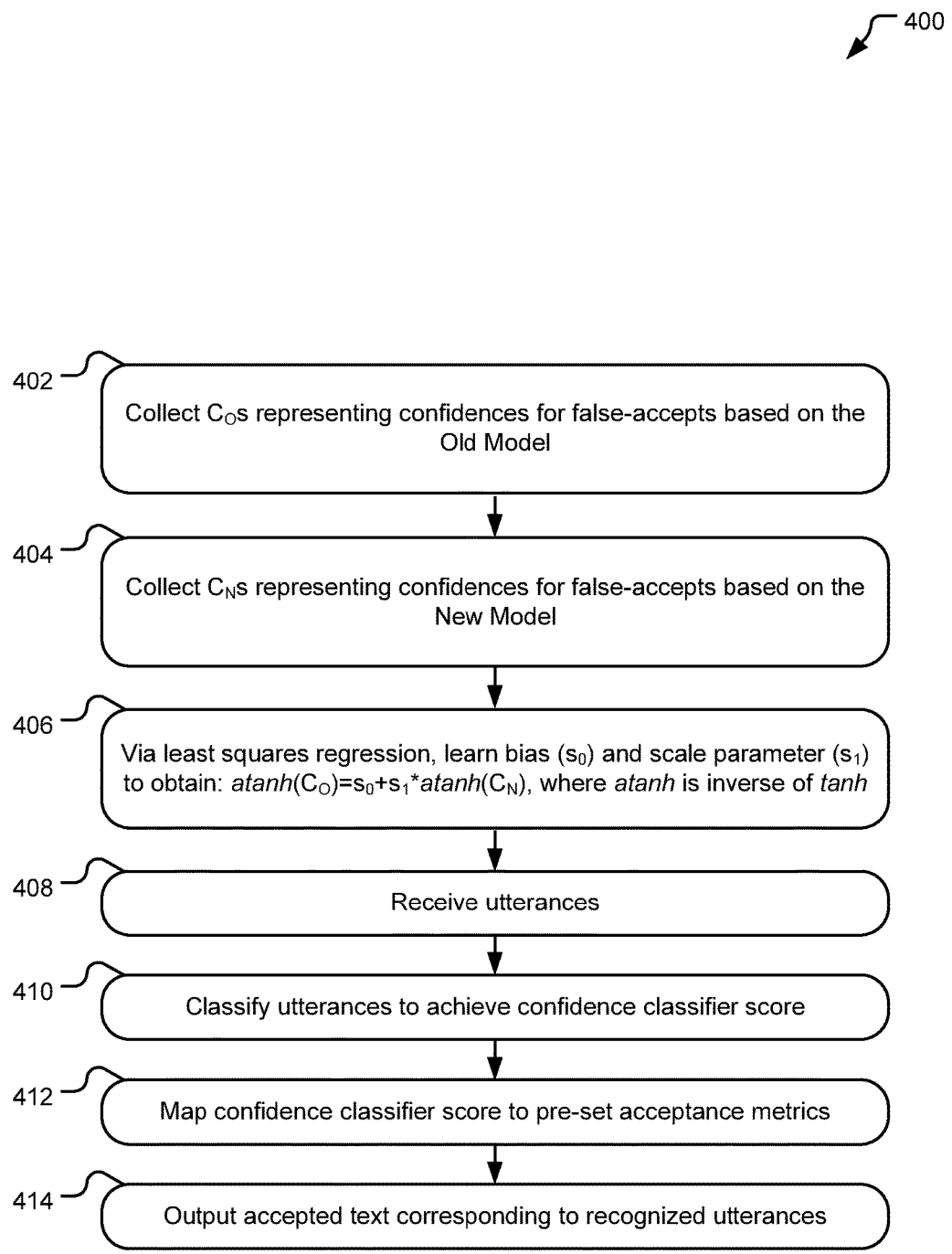
FIG. 4 illustrates example operations for normalizing confidence classifier scores using tan h-mapping.

FIG. 4 illustrates example operations for 400 normalizing confidence classifier scores using tan h-mapping. A collection operation 402 collects confidence classifier scores ($C_O$s) for false-accepts under an Old Model (e.g., a first confidence classifier). A collection operation 404 collects confidence classifier scores ($C_N$s) for false-accepts under an New Model (e.g., a second confidence classifier)

A learning operation 406 learns a bias parameter ($s_0$) and a scale parameter ($s_1$) to obtain:

$a \tan h(c_O) = s_0 + s_1 \cdot a \tan h(c_N)$, where $a \tan h$ is the invers of $\tan h$.

Given the generated tan h-mapping, a receiving operation 408 receives acoustic utterances. A classification operation 410 classifies the utterances to achieve a confidence classifier score under the New Model. A mapping operation 412 maps the confidence classifier score to a mapped confidence classifier score under the Old Model based on the tan h-mapping equation and determines whether the mapped confidence classifier score satisfies the recognition acceptance condition (e.g., whether the score exceeds an acceptance threshold). If so, recognized text associated with the condition-satisfying confidence classifier score is output as accepted text corresponding to the recognized utterances in an operation 414.

It should be understood that the operations 400 could be modified to use correct-accepts instead of false-accepts. Alternatively, other acceptance metrics may potentially be used in operations 400 with a similar approach. In yet another alternative implementation, both false-accept mappings and correct-accept mappings are generated by individually learning the corresponding mappings for false-recognitions and correct-recognitions and then taking an appropriate weighted-average of the two mappings to yield a combined normalization mapping.

Figure 5:
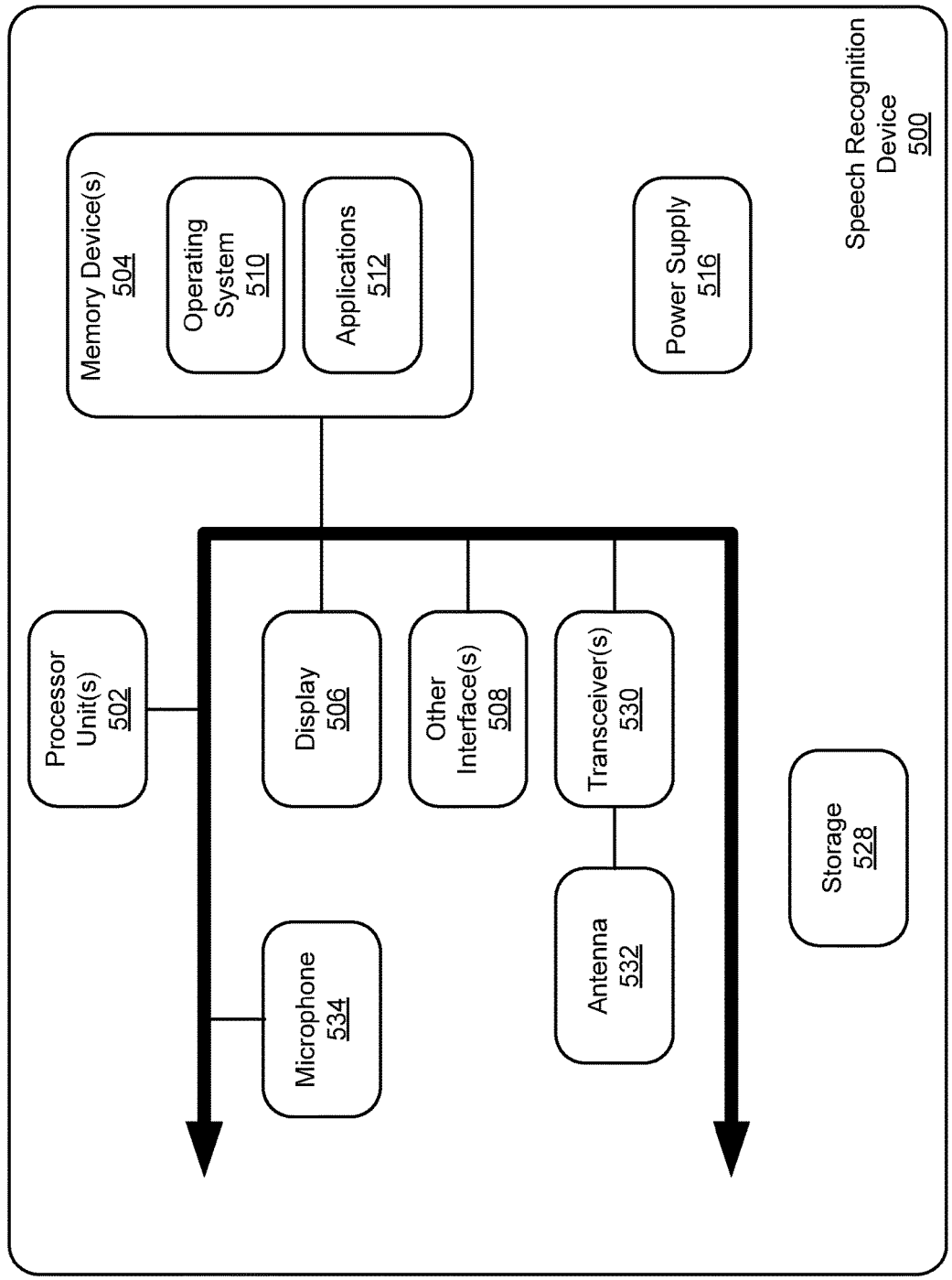
FIG. 5 illustrates an example schematic of a speech recognition device configured to performed automatic speech recognition using normalization of confidence classifier scores.

FIG. 5 illustrates an example schematic of a speech recognition device 500 configured to performed automatic speech recognition using normalization of confidence classifier scores. The speech recognition device 500 includes one or more processor units 502, one or more memory devices 504, a display 506 (e.g., a touchscreen display or lights, a hardcopy output device such as a printer), and other interfaces 508 (e.g., a buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more software programs 512, such as confidence classifiers and programs to support speech recognition circuitry, confidence classifier circuitry, normalization circuitry, are loaded in the memory 1004 and executed on the operating system 510 by the processor(s) 502.

The speech recognition device 500 includes a power supply 516, which is powered by one or more batteries or other power sources and which provides power to other components of the speech recognition device 500. The power supply 516 may also be connected to an external power source that overrides or recharges the built-in batteries or other power sources.

The speech recognition device 500 includes one or more communication transceivers 530 and an antenna 532 to provide network connectivity (e.g., a mobile phone network, Wi-Fi®, BlueTooth®, etc.). The speech recognition device 500 may also include various other components, such as a positioning system (e.g., a global positioning satellite transceiver), one or more accelerometers, one or more cameras, an audio interface (e.g., a microphone 534, an audio amplifier and speaker and/or audio jack), and additional storage 528. Other configurations may also be employed.

In an example implementation, a mobile operating system, various applications (including a as confidence classifiers and programs to support speech recognition circuitry, confidence classifier circuitry, normalization circuitry), and other modules and services may be embodied by instructions stored in memory 504 and/or storage devices 528 and processed by the processing unit(s) 502. Acoustic models, a corpus, acceptance metrics, confidence scores, received acoustic utterances, recognized/accepted text, and other data may be stored in memory 504 and/or storage devices 508 as persistent datastores.

The speech recognition 500 may include a variety of tangible computer-readable storage media and intangible computer-readable communication signals. Tangible computer-readable storage can be embodied by any available media that can be accessed by the speech recognition device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by the speech recognition device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example speech recognition device for accurate transformation of acoustic utterances into text includes an acoustic sensor configured to receive one or more acoustic utterances, one or more memory devices configured to receive and store a set of one or more acoustic models having trained one or more confidence classifiers and to store one or more acceptance metrics defining at least one recognition acceptance condition, automatic speech recognition circuitry, normalization circuitry, and a text output interface. The automatic speech recognition circuitry includes at least one processor unit for executing confidence classifier circuitry. The confidence classifier circuitry is configured to generate a first speech recognition confidence classifier score corresponding to the one or more received acoustic utterances and recognized text based on a first confidence classifier and to generate a second speech recognition confidence classifier score corresponding to the one or more received acoustic utterances and the recognized text based on a second confidence classifier. The normalization circuitry is connected to the automatic speech recognition circuitry to receive the first and second speech recognition confidence classifier score from the confidence classifier circuitry and to map the second speech recognition confidence classifier score based on the first speech recognition confidence classifier score to yield a mapped speech recognition confidence classifier score that equally or more accurately satisfies the recognition acceptance condition than the first speech recognition confidence classifier score. The text output interface connected to receive the recognized text from the automatic speech recognition circuitry and to output a signal representing the recognized text as accepted text, if the second speech recognition confidence classifier score satisfies the recognition acceptance condition.

An example speech recognition device includes elements of any preceding claim wherein the normalization circuitry executes a histogram-based mapping generating the mapped speech recognition confidence classifier score that equally or more accurately satisfies the recognition acceptance condition than the first speech recognition confidence classifier score.

An example speech recognition device includes elements of any preceding claim wherein the normalization circuitry executes a histogram-based mapping by generating probability mass functions for confidence scores from the first and second confidence classifiers, generating a cumulative mass functions corresponding to the probability mass functions for confidence scores from the first and second confidence classifiers, respectively, and generating an acceptance criteria map in which the cumulative mass function for the second classifier for each confidence score in the acceptance criteria map equals the cumulative mass function for the first classifier for each confidence score within a preset resolution.

An example speech recognition device includes elements of any preceding claim wherein the normalization circuitry executes a polynomial-based mapping generating the mapped speech recognition confidence classifier score that equally or more accurately satisfies the recognition acceptance condition than the first speech recognition confidence classifier score.

An example speech recognition device includes elements of any preceding claim wherein the normalization circuitry executes a polynomial-based mapping by collecting a set of acceptance metrics from the first confidence classifier and a set of acceptance metrics from the second confidence classifier, sampling the sets of acceptance metrics at a specified sampling interval to obtain a sampled set of confidence threshold for the first confidence classifier and a sampled set of confidence thresholds for the first confidence classifier, and learning a polynomial that represents a set of confidence thresholds for the first and second confidence classifiers with a preset resolution.

An example speech recognition device includes elements of any preceding claim wherein the normalization circuitry executes a tan h-based mapping generating the mapped speech recognition confidence classifier score that equally or more accurately satisfies the recognition acceptance condition than the first speech recognition confidence classifier score.

An example speech recognition device includes elements of any preceding claim wherein the normalization circuitry executes a tan h-based mapping by collecting a set of confidence scores representing acceptance metrics from the first confidence classifier and a set of confidence scores representing acceptance metrics from the second confidence classifier, learning a bias parameter and a scale parameter such that a tan h of the confidence scores representing acceptance metrics from the first confidence classifier equals the bias parameter plus a product of the scale parameter and a tan h of the confidence scores representing acceptance metrics from the first confidence classifier.

An example speech recognition device includes elements of any preceding claim wherein the text output interface outputs the signal representing the accepted text to a display.

An example method of transforming acoustic utterances into text in a speech recognition device includes receiving one or more acoustic utterances via a an acoustic sensor configured of the speech recognition device, storing a set of one or more acoustic models having trained one or more confidence classifiers and one or more acceptance metrics defining at least one recognition acceptance condition, generating a first speech recognition confidence classifier score corresponding to the one or more received acoustic utterances and recognized text based on a first confidence classifier, generating a second speech recognition confidence classifier score corresponding to the one or more received acoustic utterances and the recognized text based on a second confidence classifier, mapping the second speech recognition confidence classifier score based on the first speech recognition confidence classifier score to yield a mapped speech recognition confidence classifier score that equally or more accurately satisfies the recognition acceptance condition than the first speech recognition confidence classifier score, and outputting a signal representing the recognized text as accepted text, if the second speech recognition confidence classifier score satisfies the recognition acceptance condition.

An example method includes elements of any preceding claim wherein the mapping operation includes histogram-based mapping generating the mapped speech recognition confidence classifier score that equally or more accurately satisfies the recognition acceptance condition than the first speech recognition confidence classifier score.

An example method includes elements of any preceding claim wherein histogram-mapping operation includes generating probability mass functions for confidence scores from the first and second confidence classifiers, generating a cumulative mass functions corresponding to the probability mass functions for confidence scores from the first and second confidence classifiers, respectively, and generating an acceptance criteria map in which the cumulative mass function for the second classifier for each confidence score in the acceptance criteria map equals the cumulative mass function for the first classifier for each confidence score within a preset resolution.

An example method includes elements of any preceding claim wherein the mapping operation includes polynomial-based mapping generating the mapped speech recognition confidence classifier score that equally or more accurately satisfies the recognition acceptance condition than the first speech recognition confidence classifier score.

An example method includes elements of any preceding claim wherein the polynomial-based mapping operation includes collecting a set of acceptance metrics from the first confidence classifier and a set of acceptance metrics from the second confidence classifier, sampling the sets of acceptance metrics at a specified sampling interval to obtain a sampled set of confidence threshold for the first confidence classifier and a sampled set of confidence thresholds for the first confidence classifier, and learning a polynomial that represents a set of confidence thresholds for the first and second confidence classifiers with a preset resolution.

An example method includes elements of any preceding claim wherein the mapping operation includes tan h-based mapping generating the mapped speech recognition confidence classifier score that equally or more accurately satisfies the recognition acceptance condition than the first speech recognition confidence classifier score.

An example method includes elements of any preceding claim wherein the polynomial-based mapping operation includes collecting a set of confidence scores representing acceptance metrics from the first confidence classifier and a set of confidence scores representing acceptance metrics from the second confidence classifier and learning a bias parameter and a scale parameter such that a tan h of the confidence scores representing acceptance metrics from the first confidence classifier equals the bias parameter plus a product of the scale parameter and a tan h of the confidence scores representing acceptance metrics from the first confidence classifier.

An example method includes elements of any preceding claim and further includes outputting the signal representing the recognized text to a display.

One or more tangible processor-readable storage media embodied with instructions for executing on one or more processors and circuits of a speech recognition device an example process to transform acoustic utterances into text. The example process includes receive one or more acoustic utterances via a an acoustic sensor configured of the speech recognition device, storing a set of one or more acoustic models having trained one or more confidence classifiers and one or more acceptance metrics defining at least one recognition acceptance condition, generating a first speech recognition confidence classifier score corresponding to the one or more received acoustic utterances and recognized text based on a first confidence classifier, generating a second speech recognition confidence classifier score corresponding to the one or more received acoustic utterances and the recognized text based on a second confidence classifier, mapping the second speech recognition confidence classifier score based on the first speech recognition confidence classifier score to yield a mapped speech recognition confidence classifier score that equally or more accurately satisfies the recognition acceptance condition than the first speech recognition confidence classifier score, and outputting a signal representing the recognized text as accepted text, if the second speech recognition confidence classifier score satisfies the recognition acceptance condition.

One or more tangible processor-readable storage media includes elements of any preceding claim wherein the mapping operation includes histogram-based mapping generating the mapped speech recognition confidence classifier score that equally or more accurately satisfies the recognition acceptance condition than the first speech recognition confidence classifier score.

One or more tangible processor-readable storage media includes elements of any preceding claim wherein the mapping operation includes polynomial-based mapping generating the mapped speech recognition confidence classifier score that equally or more accurately satisfies the recognition acceptance condition than the first speech recognition confidence classifier score.

One or more tangible processor-readable storage media includes elements of any preceding claim wherein the mapping operation includes tan h-based mapping generating the mapped speech recognition confidence classifier score that equally or more accurately satisfies the recognition acceptance condition than the first speech recognition confidence classifier score.

An example speech recognition device for accurate transformation of acoustic utterances into text includes means for receiving one or more acoustic utterances via a an acoustic sensor configured of the speech recognition device, means for storing a set of one or more acoustic models having trained one or more confidence classifiers and one or more acceptance metrics defining at least one recognition acceptance condition, means for generating a first speech recognition confidence classifier score corresponding to the one or more received acoustic utterances and recognized text based on a first confidence classifier, means for generating a second speech recognition confidence classifier score corresponding to the one or more received acoustic utterances and the recognized text based on a second confidence classifier, means for mapping the second speech recognition confidence classifier score based on the first speech recognition confidence classifier score to yield a mapped speech recognition confidence classifier score that equally or more accurately satisfies the recognition acceptance condition than the first speech recognition confidence classifier score, and means for outputting a signal representing the recognized text as accepted text, if the second speech recognition confidence classifier score satisfies the recognition acceptance condition.

An example speech recognition device for accurate transformation of acoustic utterances into text includes elements of any preceding claim wherein the means for mapping includes histogram-based mapping means for generating the mapped speech recognition confidence classifier score that equally or more accurately satisfies the recognition acceptance condition than the first speech recognition confidence classifier score.

An example speech recognition device for accurate transformation of acoustic utterances into text includes elements of any preceding claim and includes means for histogram-mapping including means for generating probability mass functions for confidence scores from the first and second confidence classifiers, means for generating a cumulative mass functions corresponding to the probability mass functions for confidence scores from the first and second confidence classifiers, respectively, and means for generating an acceptance criteria map in which the cumulative mass function for the second classifier for each confidence score in the acceptance criteria map equals the cumulative mass function for the first classifier for each confidence score within a preset resolution.

An example speech recognition device for accurate transformation of acoustic utterances into text includes elements of any preceding claim wherein the means for mapping includes polynomial-based mapping means for generating the mapped speech recognition confidence classifier score that equally or more accurately satisfies the recognition acceptance condition than the first speech recognition confidence classifier score.

An example speech recognition device for accurate transformation of acoustic utterances into text includes elements of any preceding claim wherein means for polynomial-based mapping includes means for collecting a set of acceptance metrics from the first confidence classifier and a set of acceptance metrics from the second confidence classifier, means for sampling the sets of acceptance metrics at a specified sampling interval to obtain a sampled set of confidence threshold for the first confidence classifier and a sampled set of confidence thresholds for the first confidence classifier, and means for learning a polynomial that represents a set of confidence thresholds for the first and second confidence classifiers with a preset resolution.

An example speech recognition device for accurate transformation of acoustic utterances into text includes elements of any preceding claim wherein the means for mapping includes tan h-based mapping means for generating the mapped speech recognition confidence classifier score that equally or more accurately satisfies the recognition acceptance condition than the first speech recognition confidence classifier score.

An example speech recognition device for accurate transformation of acoustic utterances into text includes elements of any preceding claim wherein means for tan h-based mapping includes means for collecting a set of confidence scores representing acceptance metrics from the first confidence classifier and a set of confidence scores representing acceptance metrics from the second confidence classifier and means for learning a bias parameter and a scale parameter such that a tan h of the confidence scores representing acceptance metrics from the first confidence classifier equals the bias parameter plus a product of the scale parameter and a tan h of the confidence scores representing acceptance metrics from the first confidence classifier.

An example speech recognition device for accurate transformation of acoustic utterances into text includes elements of any preceding claim wherein the means for means for outputting includes means for outputting the signal representing the recognized text to a display.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A speech recognition device for accurate transformation of acoustic utterances into text, the speech recognition device comprising:
   an acoustic sensor configured to receive one or more acoustic utterances;
   one or more memory devices configured to receive and store a set of one or more acoustic models having trained one or more confidence classifiers and to store one or more acceptance metrics defining at least one recognition acceptance condition;
   automatic speech recognition circuitry including at least one processor unit for executing confidence classifier circuitry, the confidence classifier circuitry being configured to generate a first speech recognition confidence classifier score corresponding to the one or more received acoustic utterances and recognized text based on a first confidence classifier and to generate a second speech recognition confidence classifier score corresponding to the one or more received acoustic utterances and the recognized text based on a second confidence classifier;
   normalization circuitry connected to the automatic speech recognition circuitry to receive the first and second speech recognition confidence classifier scores from the confidence classifier circuitry and to map a distribution within an output range of the second confidence classifier to a distribution within an output range of the first confidence classifier, the mapped distribution including a mapped speech recognition confidence classifier score for the second confidence classifier that more accurately satisfies the recognition acceptance condition than a corresponding score from the first confidence classifier; and
   a text output interface connected to receive new recognized text from the automatic speech recognition circuitry for a newly-received acoustic utterance and to output a signal representing the new recognized text as accepted text responsive to a determination that a mapped speech recognition confidence classifier score of the second confidence classifier for the newly-received acoustic utterance satisfies the recognition acceptance condition.

2. The speech recognition device of claim 1 wherein the normalization circuitry executes a histogram-based mapping generating the mapped speech recognition confidence classifier score that equally or more accurately satisfies the recognition acceptance condition than the first speech recognition confidence classifier score.

3. The speech recognition device of claim 2 wherein the normalization circuitry executes the histogram-based mapping by generating probability mass functions for confidence scores from the first and second confidence classifiers, generating a cumulative mass functions corresponding to the probability mass functions for confidence scores from the first and second confidence classifiers, respectively, and generating an acceptance criteria map in which the cumulative mass function for the second classifier for each confidence score in the acceptance criteria map equals the cumulative mass function for the first classifier for each confidence score within a preset resolution.

4. The speech recognition device of claim 1 wherein the normalization circuitry executes a polynomial-based mapping generating the mapped speech recognition confidence classifier score that equally or more accurately satisfies the recognition acceptance condition than the first speech recognition confidence classifier score.

5. The speech recognition device of claim 4 wherein the normalization circuitry executes the polynomial-based mapping by collecting a set of acceptance metrics from the first confidence classifier and a set of acceptance metrics from the second confidence classifier, sampling the sets of acceptance metrics at a specified sampling interval to obtain a sampled set of confidence threshold for the first confidence classifier and a sampled set of confidence thresholds for the first confidence classifier, and learning a polynomial that represents a set of confidence thresholds for the first and second confidence classifiers with a preset resolution.

6. The speech recognition device of claim 1 wherein the normalization circuitry executes a tan h-based mapping generating the mapped speech recognition confidence classifier score that equally or more accurately satisfies the recognition acceptance condition than the first speech recognition confidence classifier score.

7. The speech recognition device of claim 6 wherein the normalization circuitry executes the tan h-based mapping by collecting a set of confidence scores representing acceptance metrics from the first confidence classifier and a set of confidence scores representing acceptance metrics from the second confidence classifier, learning a bias parameter and a scale parameter such that a tan h of the confidence scores representing acceptance metrics from the first confidence classifier equals the bias parameter plus a product of the scale parameter and a tan h of the confidence scores representing acceptance metrics from the first confidence classifier.

8. The speech recognition device of claim 1 wherein the text output interface outputs the signal representing the accepted text to a display.

9. A method of transforming acoustic utterances into text in a speech recognition device, the method comprising:
receiving one or more acoustic utterances via an acoustic sensor configured of the speech recognition device;
storing a set of one or more acoustic models having trained one or more confidence classifiers and one or more acceptance metrics defining at least one recognition acceptance condition;
generating a first speech recognition confidence classifier score corresponding to the one or more received acoustic utterances and recognized text based on a first confidence classifier;
generating a second speech recognition confidence classifier score corresponding to the one or more received acoustic utterances and the recognized text based on a second confidence classifier;
mapping a distribution within an output range of the second confidence classifier to a distribution within an output range of the first confidence classifier, the mapped distribution including a mapped speech recognition confidence classifier score for the second confidence classifier that more accurately satisfies the recognition acceptance condition than a corresponding score from the first confidence classifier; and
outputting a signal representing new recognized text for a newly-received acoustic utterance as accepted text responsive to a determination that a mapped speech recognition confidence classifier score of the second confidence classifier for the newly-received acoustic utterance satisfies the recognition acceptance condition.

10. The method of claim 9 wherein the mapping operation comprises:
histogram-based mapping generating the mapped speech recognition confidence classifier score that equally or more accurately satisfies the recognition acceptance condition than the first speech recognition confidence classifier score.

11. The method of claim 9 wherein the histogram-mapping operation comprises:
generating probability mass functions for confidence scores from the first and second confidence classifiers, generating a cumulative mass functions corresponding to the probability mass functions for confidence scores from the first and second confidence classifiers, respectively, and generating an acceptance criteria map in which the cumulative mass function for the second classifier for each confidence score in the acceptance criteria map equals the cumulative mass function for the first classifier for each confidence score within a preset resolution.

12. The method of claim 9 wherein the mapping operation comprises:
polynomial-based mapping generating the mapped speech recognition confidence classifier score that equally or more accurately satisfies the recognition acceptance condition than the first speech recognition confidence classifier score.

13. The method of claim 12 wherein the polynomial-based mapping operation comprises:
collecting a set of acceptance metrics from the first confidence classifier and a set of acceptance metrics from the second confidence classifier, sampling the sets of acceptance metrics at a specified sampling interval to obtain a sampled set of confidence threshold for the first confidence classifier and a sampled set of confidence thresholds for the first confidence classifier, and learning a polynomial that represents a set of confidence thresholds for the first and second confidence classifiers with a preset resolution.

14. The method of claim 9 wherein the mapping operation comprises:
tan h-based mapping generating the mapped speech recognition confidence classifier score that equally or more accurately satisfies the recognition acceptance condition than the first speech recognition confidence classifier score.

15. The method of claim 14 wherein the tan h-based mapping operation comprises:
collecting a set of confidence scores representing acceptance metrics from the first confidence classifier and a set of confidence scores representing acceptance metrics from the second confidence classifier, and learning a bias parameter and a scale parameter such that a a tan h of the confidence scores representing acceptance metrics from the first confidence classifier equals the bias parameter plus a product of the scale parameter and a tan h of the confidence scores representing acceptance metrics from the first confidence classifier.

16. The method of claim 9 further comprising:
outputting the signal representing the recognized text to a display.

17. One or more computer-readable storage media of a tangible article of manufacture encoding computer-executable instructions for executing on one or more processors and circuits of a speech recognition device a process to transform acoustic utterances into text, the process comprising:

receiving one or more acoustic utterances via an acoustic sensor configured of the speech recognition device;

storing a set of one or more acoustic models having trained one or more confidence classifiers and one or more acceptance metrics defining at least one recognition acceptance condition;

generating a first speech recognition confidence classifier score corresponding to the one or more received acoustic utterances and recognized text based on a first confidence classifier;

generating a second speech recognition confidence classifier score corresponding to the one or more received acoustic utterances and the recognized text based on a second confidence classifier;

mapping a distribution within an output range of the second confidence classifier to a distribution within an output range of the first confidence classifier, the mapped distribution including a mapped speech recognition confidence classifier score for the second confidence classifier that more accurately satisfies the recognition acceptance condition than a corresponding score from the first confidence classifier; and outputting a signal representing new recognized text for a newly-received acoustic utterance as accepted text responsive to a determination that a mapped speech recognition confidence classifier score of the second confidence classifier for the newly-received acoustic utterance satisfies the recognition acceptance condition.

18. The one or more tangible computer-readable storage media of claim 17 wherein the mapping operation comprises:

histogram-based mapping generating the mapped speech recognition confidence classifier score that equally or more accurately satisfies the recognition acceptance condition than the first speech recognition confidence classifier score.

19. The one or more tangible computer-readable storage media of claim 17 wherein the mapping operation comprises:

polynomial-based mapping generating the mapped speech recognition confidence classifier score that equally or more accurately satisfies the recognition acceptance condition than the first speech recognition confidence classifier score.

20. The one or more tangible computer-readable storage media of claim 17 wherein the mapping operation comprises:

tan h-based mapping generating the mapped speech recognition confidence classifier score that equally or more accurately satisfies the recognition acceptance condition than the first speech recognition confidence classifier score.

* * * * *